(12) United States Patent
Grossman

(10) Patent No.: US 6,564,844 B1
(45) Date of Patent: May 20, 2003

(54) LABELING DEVICE AND LABEL

(75) Inventor: Stanley I. Grossman, London (GB)

(73) Assignee: Rocky Mountain Traders, Inc., London (GB)

( * ) Notice: Subject to any disclaimer, the term of this patent is extended or adjusted under 35 U.S.C. 154(b) by 0 days.

(21) Appl. No.: 09/716,555

(22) Filed: Nov. 20, 2000

Related U.S. Application Data

(63) Continuation of application No. 09/315,569, filed on May 20, 1999, now Pat. No. 6,149,763, which is a continuation of application No. 09/035,390, filed on Mar. 5, 1998, now Pat. No. 5,925,200, which is a continuation of application No. 08/806,316, filed on Feb. 26, 1997, now Pat. No. 5,783,033.

(30) Foreign Application Priority Data

Feb. 26, 1996 (GB) .............................................. 9604048

(51) Int. Cl.7 .............................. B65C 1/02; B65C 9/26
(52) U.S. Cl. ...................... 156/391; 156/538; 156/556; 156/580; 156/DIG. 2; 156/DIG. 37
(58) Field of Search ................................ 156/556, 538, 156/391, 579, 574, 580, DIG. 24

(56) References Cited

U.S. PATENT DOCUMENTS

| | | |
|---|---|---|
| 1,500,698 A | 7/1924 | Wiehl |
| 1,821,916 A | 9/1931 | Acheson et al. |
| 1,843,140 A | 2/1932 | Mills |
| 2,302,503 A | 11/1942 | Proctor |
| 3,071,381 A | 1/1963 | Schneider |
| 3,165,320 A | 1/1965 | Ryan |
| 3,165,321 A | 1/1965 | Osborne et al. |
| 3,193,295 A | 7/1965 | Isemura |
| 3,223,442 A | 12/1965 | Fawdry et al. |
| 3,436,082 A | 4/1969 | Bostrom et al. |
| 3,509,992 A | 5/1970 | David et al. |
| 3,561,768 A | 2/1971 | Castagna |
| 3,570,661 A | 3/1971 | Kersh |
| 3,687,769 A | 8/1972 | Dague |
| 3,768,815 A | 10/1973 | Mathurin |
| 3,770,908 A | 11/1973 | Craggs |
| 3,871,663 A | 3/1975 | Stave |

(List continued on next page.)

FOREIGN PATENT DOCUMENTS

| | | | |
|---|---|---|---|
| AU | 670909 | * 8/1996 | |
| DE | 2 009 816 | 4/1973 | |
| DE | 29610120 U1 | * 11/1996 | |
| EP | 0026475 A1 | 10/1979 | |
| EP | 0 203 752 | 12/1986 | |
| EP | 04227741 A2 | 4/1991 | |
| EP | 0553034 A2 | 1/1993 | |
| EP | 0 868 353 | 2/1999 | |
| GB | 2 212 133 | 7/1989 | |
| JP | 2-17230 | 5/1990 | |
| JP | 02127230 A | * 5/1990 | ............. B65C/1/02 |
| JP | 5-325495 | 12/1993 | |
| WO | WO 94/13446 A1 | 6/1994 | |
| WO | WO 96/05057 A1 | 2/1996 | |

Primary Examiner—Richard Crispino
Assistant Examiner—Sue A Purvis
(74) Attorney, Agent, or Firm—Ohlandt, Greeley, Ruggiero & Perle L.L.P.

(57) ABSTRACT

A compact disc labeling device for manual application of a label to a compact disc includes an assembly having a circumferential flange with an upper flange surface, a piston, a first rod having a diameter approximately equal to the diameter of the label's central aperture and that extends from the upper surface of the piston, and a second rod having a diameter approximately equal to the diameter of the disc's central aperture and that extends from the first rod. In use, a label is placed on the flange with the first rod projecting through its central aperture and the disc positioned on the second rod through its central aperture. When the piston is moved from an upper first position to a lower second position, the disc is applied to the label.

22 Claims, 2 Drawing Sheets

U.S. PATENT DOCUMENTS

| | | |
|---|---|---|
| 3,940,793 A | 2/1976 | Bleiman |
| 4,085,178 A | 4/1978 | McNeely et al. |
| 4,171,531 A | 10/1979 | Grapes et al. |
| 4,213,927 A | 7/1980 | Alberti |
| 4,306,344 A | 12/1981 | Floss |
| 4,313,718 A | 2/1982 | Llabres et al. |
| 4,340,955 A | 7/1982 | Elliott |
| 4,358,843 A | 11/1982 | Rager |
| 4,385,460 A | 5/1983 | Hanna |
| 4,408,318 A | 10/1983 | Sugiura |
| 4,420,830 A | 12/1983 | Green |
| 4,470,137 A | 9/1984 | Tago |
| 4,499,516 A | 2/1985 | Purdy et al. |
| 4,514,839 A | 4/1985 | Eisemann |
| 4,549,922 A | 10/1985 | Oishi et al. |
| 4,562,570 A | 12/1985 | Denton |
| 4,660,119 A | 4/1987 | Kato et al. |
| 4,687,536 A | 8/1987 | Hiramatsu et al. |
| 4,710,913 A | 12/1987 | Matsushima et al. |
| 4,730,300 A | 3/1988 | Kamoshita et al. |
| 4,871,404 A | 10/1989 | Murata et al. |
| 4,879,437 A | 11/1989 | Dard et al. |
| 4,903,255 A | 2/1990 | Sugaya et al. |
| 4,971,648 A | 11/1990 | Doering |
| 4,983,437 A | 1/1991 | Merrick |
| 5,001,700 A | 3/1991 | Rowden et al. ............. 369/270 |
| 5,084,127 A | 1/1992 | Nakamura |
| 5,316,464 A | 5/1994 | Lexell |
| 5,340,427 A | 8/1994 | Cusack et al. |
| 5,346,654 A | 9/1994 | Kodaka et al. |
| 5,412,541 A | 5/1995 | Tanaka |
| 5,417,457 A | 5/1995 | Reinhardt |
| 5,421,950 A | 6/1995 | Parrish |
| 5,435,246 A | 7/1995 | Edman |
| 5,543,001 A | 8/1996 | Casillo et al. |
| 5,770,289 A * | 6/1998 | Tracy ........................ 428/40.1 |
| 5,902,446 A | 5/1999 | Casillo et al. |
| 5,951,819 A * | 9/1999 | Hummell et al. ........... 156/556 |

* cited by examiner

LABELING DEVICE AND LABEL

RELATED APPLICATIONS

This a continuation application of Ser. No. 09/315,569 filed May 29, 1999, which issued as U.S. Pat. No. 6,149,763 on Nov. 21, 2000, which is a continuation application of application Ser. No. 09/035,390 filed Mar. 5, 1998, which issued as U.S. Pat. No. 5,925,200 on Jul. 20, 1999, which is a continuation of application Ser. No. 08/806,316, filed Feb. 26, 1997, which issued as U.S. Pat. No. 5,783,033 on Jul. 21, 1998.

FIELD OF THE INVENTION

This invention relates to a device for applying or adhering two substantially planar discs each having a central aperture so that they are concentrically aligned. More specifically, the invention relates to a device for centering and applying labels to compact discs.

BACKGROUND OF THE PRIOR ART

Present electro-optical storage devices include Compact Disc Read Only Memory devices (CD-ROMs) that store digital information. The information is either or both audio and visual in nature. The information can also include data. CD ROMs comprise a plastic or "glass" disc that is coated with a metallic surface. The surface is etched or cut such that when placed in a CD ROM reader and spun at high speed, the etched pattern may be identified by a laser or other scanning method.

By their form, function and manufacture, CD ROMs are generally indistinguishable from one another. It is also generally difficult, if not impossible, to identify the nature or content of the information on a given CD ROM by visual inspection alone. It is therefore necessary to provide CD ROMs with a physical, unique mark or label.

The capability of a CD ROM to faithfully represent the information contained thereon is in large part dependent on the ability of the disc to be placed into a sustained, steady high speed spin about its physical center. This high speed spin presents complications to the marking methods employed.

Traditional ink based marketing methods in which the ink is applied directly to the disc must use an ink that will remain in place during sustained high speed spin. Additionally, the ink must be non-deleterious to the material of the disc. Use of conventional writing instruments, such as felt tip pens, is generally unsatisfactory since the ink may particulate and separate from the disc with the potential for becoming lodged in the mechanism of the disc reader. In addition, marking in this way does not present a professional appearance, especially if the CD ROMs are to be sold or used commercially.

Printers specially adapted for printing onto compact discs are available. However, the cost of such printers is prohibitive to those who produce CDROMs in low volumes.

An alternative to using an ink marker directly on the disc is to use a label, usually a self-adhesive label, that is subsequently attached to the disc. Because of the high speed at which the disc must be spun, it is essential that the label be affixed in such a way that the overall balance of the disc is not adversely affected. In particular, it is necessary that the center of balance of the disc remains about its geometric center. Labels which are not concentrically affixed to the discs, for example, "half-moon" or semi-circular labels, have previously caused malfunctions and often rendered the discs virtually useless.

A known manual device for concentrically applying a self-adhesive label to a compact disc comprises a first member having a cylinder closed at one end by a slightly convex exterior face with a central aperture corresponding approximately to the size of the central aperture of the label, and a second member having a first portion with a diameter approximate to the diameter of the aperture of the first member and a second portion having a diameter approximate to the diameter of the central aperture of the compact disc. The first and second portions together form a shoulder against which the compact disc is seated.

In use, the operator must initially position an adhesive label on the first member so that its adhesive surface is uppermost. The label aperture is aligned with the central aperture of the end face of the cylinder. This step alone can be difficult because of the tendency of the label to stick to the operators fingers and hence move off-center when the operator attempts to withdraw his/her fingers in order for the compact disc to be pressed onto the label. Also, there is a tendency for the label to curl upwards when the operator is not holding the label down.

Once the label is in its desired position on the first member, the compact disc which is retained against the shoulder portion of the plunger can be pressed down onto the label. In order to achieve the desired concentric alignment between the label and the disc, it is necessary to press firmly the disc against the shoulder portion while pushing the first portion of the plunger through the aligned apertures of the first member and the label.

Since the surface of the first member against which the label and compact disc are pressed is not planar, further care has to be taken to ensure that no air bubbles are trapped between the label and the disc. Such air bubbles are not only unsightly, but may also cause balancing problems in the CD ROM reader.

It will be appreciated that this known device therefore relies upon the skill and manual dexterity of the operator in order to achieve correct alignment of the label and the compact disc. Moreover, the device is reliant upon the operator being sufficiently well-organized to keep the two components in close proximity ready for use.

Accordingly, it is an object of the present invention to provide a device that overcomes the aforementioned problems and is inexpensive to produce, manually operable, permits reliable alignment of the label and the compact disc, and substantially eliminates the opportunity for operator error.

SUMMARY OF THE INVENTION

The present invention, in a first embodiment, is directed to a unitary device for applying a first substantially planar member having a central aperture of a first diameter to a second substantially planar member having a central aperture of a second diameter. The device includes: an assembly having a circumferential flange with an upper flange surface capable of supporting the first planar member; a piston member having an upper surface; a first rod having a diameter slightly less than the first diameter, extending from the upper surface of the piston member; and a second rod having a diameter slightly less than the second diameter, extending from the first rod. The first diameter is greater than the second diameter. The piston member is adapted to move from a first upward position in which the second rod and at least a portion of the first rod extend above the upper flange surface to a second lower position in which at least the first rod is entirely below, or is level with the upper flange surface so that the first and second members are pressed against each other.

The first and second members can be reliably retained with their respective central apertures in concentric alignment. By moving the piston from first to second positions, the first and second member can be brought together with their alignment maintained. By virtue of the first rod having a substantially similar diameter to the aperture of the first member, the first member can be retained in position on the flange by means of the first rod extending through its aperture. Similarly, the second rod, having a diameter substantially similar to the aperture of the second member, is able to retain the second member in position.

The device may further comprise a tube having an upper end and a lower end. The circumferential flange extends from the upper end of the tube, and the piston member is slidably received in the tube.

A further aspect of the present invention is a compact disc label capable of allowing visual inspection of the disc surface underneath the label. More particularly, the present invention comprises a transparent compact disc label.

DESCRIPTION OF THE PREFERRED EMBODIMENTS

Figure 1:
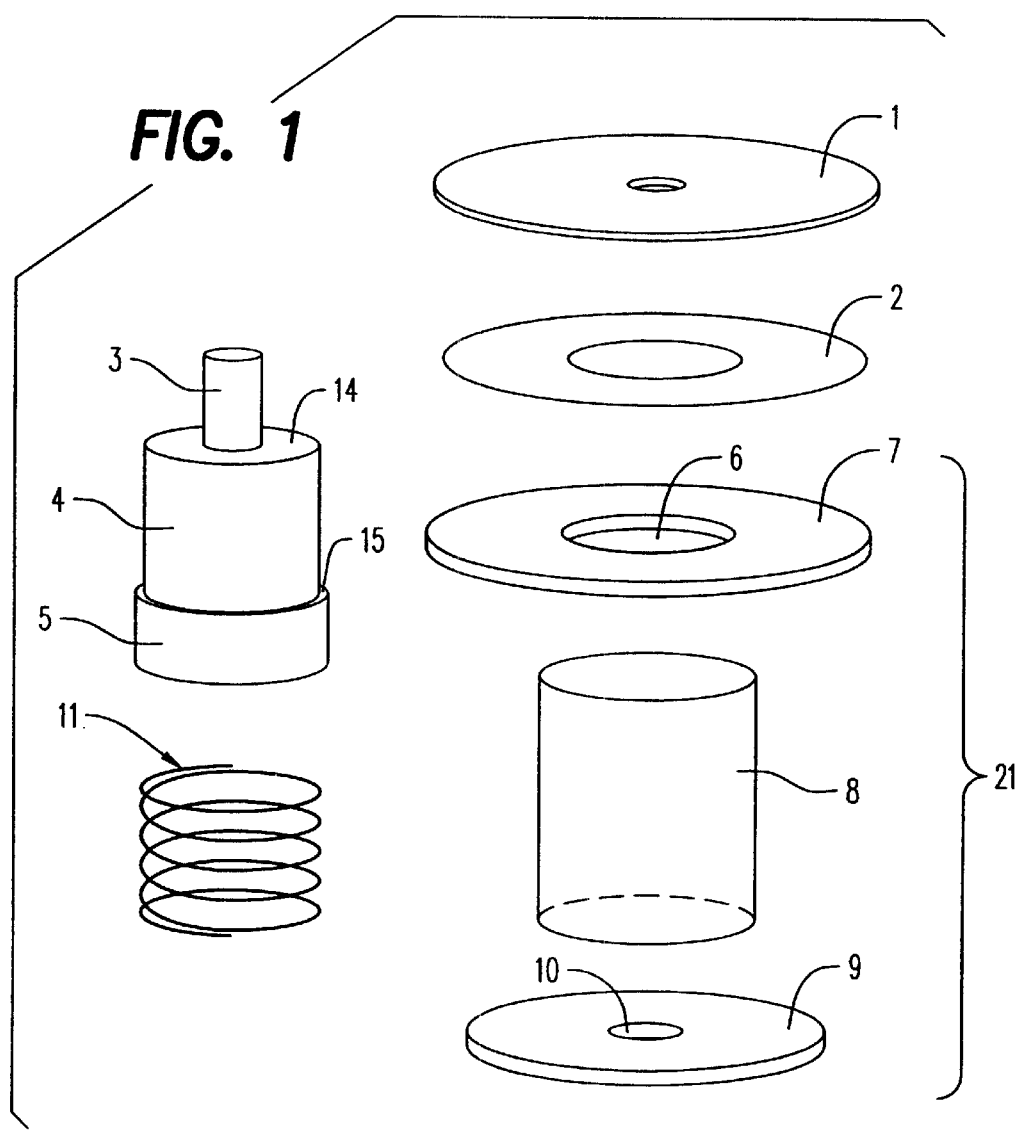
FIG. 1 is an exploded view of one embodiment of the inventive device, illustrating the components of the device, as well as the first and second planar members.

Referring to FIG. 1, the present invention comprises a top cover plate 7 having a central hole 6, a hollow structure, preferably a cylinder 8, and a bottom plate 9. The top plate 7 is affixed to structure 8 such that the structure and central hole 6 are concentrically aligned. In this preferred embodiment, bottom plate 9 is affixed to the lower opening of structure 8. The top plate 7, structure 8 and bottom plate 9 form an enclosed container 21. The container 21 houses the piston assembly. The piston assembly includes a piston 5, a first rod 4, and a second rod 3. The first rod 4 has a concentric outer diameter larger than the diameter of second rod 3. The first rod 4 is connected to second rod 3 and is preferably integral with second rod 3. The second rod 3 extends upwardly above top plate 7. The meeting of second rod 3 to first rod 4 forms a compact disc support shoulder 14. The piston 5 is free to travel upwardly and downwardly within container 21.

The preferred embodiment of the present invention illustrated in FIG. 1 includes a spring 11 housed within container 21, between bottom plate 9 and piston 5. The spring 11 ensures that piston 5 rests in a fully upward position such that second rod 3 and first rod 4 protrude upwardly through center hole 6 in top plate 7. Ideally, piston 5 is prevented from being withdrawn from the upper end of structure 8. To prevent piston 5 from being withdrawn from structure 8, a collar (not shown) can be provided on the interior of structure 8. More preferably, top plate 7 can extend beyond the interior diameter of structure 8. As shown in FIG. 1, first rod 4 to form a piston assembly retaining shoulder 15. Piston assembly retaining shoulders 15 is larger than center hole 6 such that during normal operation the piston cannot be removed from the enclosed container 21.

In the preferred embodiment, the bottom plate 9 has pressure release means 10 to provide an outlet for pressure that may form within container 21 as a result of the movement of piston 5.

The structure 8, as shown in FIG. 1, preferably is a cylinder or tube. However, structure 8 can be any configuration that permits piston 5, along with first and second rods 4, 3, respectively, and spring 11 to move therein free of friction. Accordingly, piston 5, first and second rods 4, 3, respectively, and spring 11 can be any configuration compatible with the interior of structure 8. As shown, structure 8 is cylindrical and is compatible with coiled spring 11 and cylindrical piston 5 and first and second rods 4, 3, respectively.

Figure 2:
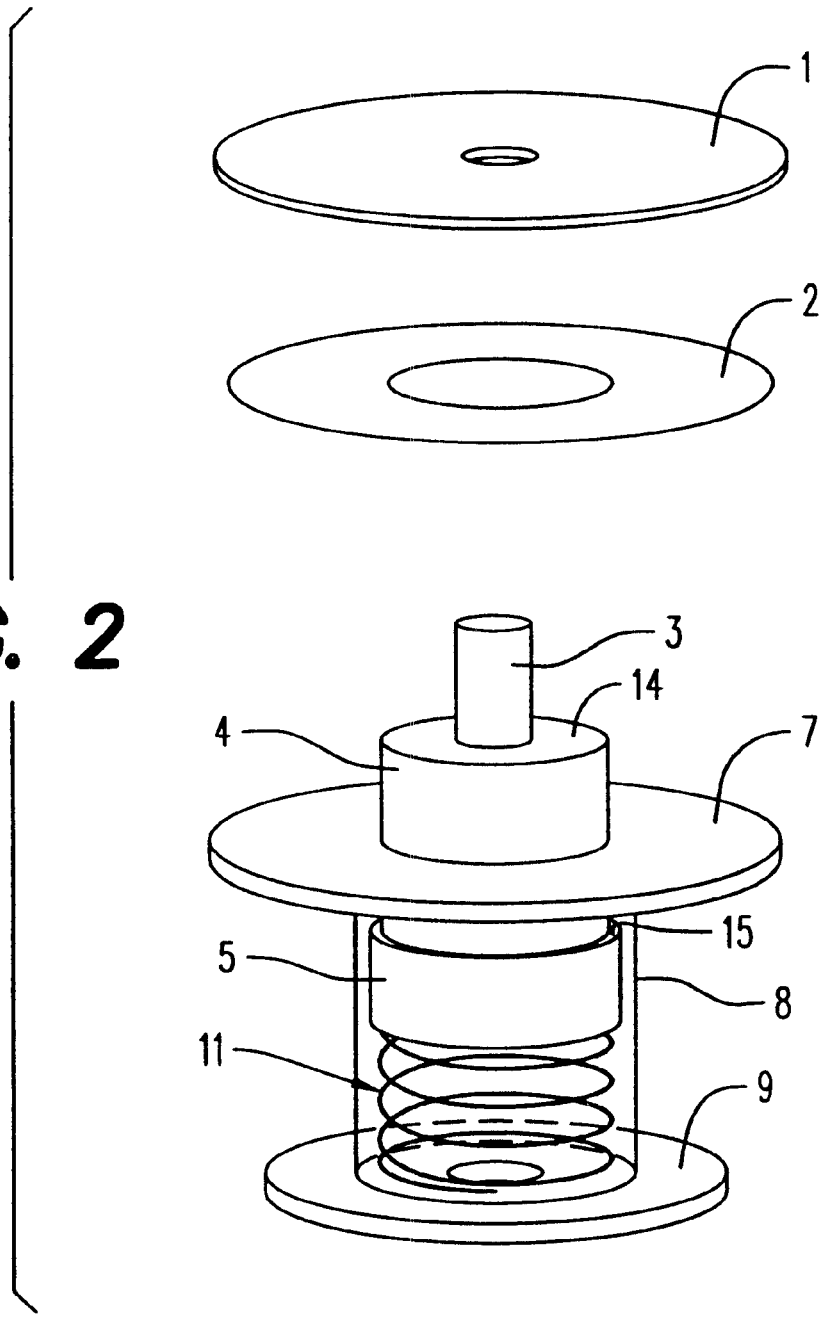
FIG. 2 is a perspective view of the assembled device of FIG. 1 with the first and second planar members in position to be placed on the device.

As shown in FIG. 2, the present invention is used to apply labels to CD ROMs as follows: a label 2 is placed onto top plate 7 with its adhesive side facing upwardly such that second rod 3 and first rod 4 protrude through the center hole of the label. The center hole of a CD ROM 1 is then placed onto second rod 3 with the side to be labeled facing downward toward the adhesive side of label 2 which is resting on top plate 7. The CD ROM 1 is prevented from coming into casual contact with the adhesive side of label 2 because first rod 4 has a diameter that is greater than the diameter of the center hole of the CD ROM.

Gentle downward pressure is applied to second rod 3 to depress piston 5 within container 21 against the action of compression spring 11. The piston 5 is gently deflected downward until the point at which first rod 4 is fully retracted into structure 8. At this point, the CD ROM 1 comes into contact with the adhesive side of label 2. The downward pressure is then gradually released allowing spring 11 to return piston 5 to its resting position making it easy for the user to remove the now labeled CD ROM 1.

In a preferred embodiment, second rod 3 has a diameter of 14 millimeters +/–0.5 millimeters, and first rod 4 has a diameter of 41 millimeters +/–0.5 millimeters. The top cover 7 has an outer diameter of about 118 to about 120 millimeters. The diameter of central hole 6 is about 41 millimeters plus sufficient clearance to allow passage of first rod 4 through central hole 6. The diameter of bottom plate 9 can be any diameter that permits the device to withstand the pressing operation of securing label 2 to CD ROM 1, and does not allow the device to fall over. For ease of manufacturing, the diameter of bottom plate 9 is approximately the same as that of top plate 7.

The structure 8 has an outside diameter of about 51 millimeters, and an inner diameter of approximately 44 millimeters. The spring 11, which must move frictionlessly in structure 8, has a diameter of about 40 millimeters. The diameter of piston 5, which must move frictionlessly in structure 8, is about 43 millimeters. The diameters of second rod 3 and first rod 4 approximate the diameter of the central aperture of a standard CD ROM, and the diameter of the central aperture of label 2, respectively.

In order to prevent pressure build-up within structure 8 when the piston 5 is depressed, bottom plate 9 can be provided with a pressure release 10. For example, pressure release 10 can be in the form of a hole, to allow air to escape from structure 8. The pressure release 10 can also be provided elsewhere on the device, such as in the wall of structure 8.

For both ease of manufacture and aesthetic purposes, the shape and size of top plate 7 can be identical to that of bottom plate 9. In order not to negate the usefulness of pressure release 10, the underside of the bottom plate 9 can be provided with a plurality of feet to raise the bottom plate from the work surface on which the device is placed. The use of feet can also help reduce the possibility of the device scratching or otherwise damaging the work surface.

The top plate 7 has an upper surface capable of supporting label 2. To achieve this, it is especially advantageous that central hole 6 has a diameter that approximates that of the center hole of label 2. Also, the outer diameter of the upper surface of top plate 7 should be the same or greater than the diameter of label 2. Furthermore, while the upper surface of top plate 7 may be slightly concave, a substantially planar surface is preferred since, when used to apply adhesive labels to compact discs, the planar surface reduces bubble formation and minimizes the flexing of the compact disc. While top plate 7 may have a circular outer radius, this is not essential and other shapes, as may be appropriate to the shape of the planar member to be supported, can be provided.

The second rod 3 extends concentrically from first rod 4. Since second rod 3 is of a smaller diameter than first rod 4, compact disc support shoulder 14 is created where the two rods are joined. The compact disc support shoulder 14 at least partially supports CD ROM 1. Because second rod 3 extends for a length or height greater than the thickness of CD ROM 1, the second rod can also function as a means for depressing piston 5 into cylinder 8. Thus, there is no need for an additional handle or grip means.

The piston 5, second rod 3, and first rod 4 can be joined to each other by any conventional means, such as, for example, adhesive or screws. For ease of manufacture and strength, it is preferable to form piston 5 and first and second rods 4, 3, respectively, in one piece, such as by molding.

Another aspect of the present invention is directed to a method for applying label 2 to a disc, such as CD ROM 1, using the device previously described. The method according to the present invention is suitable for applying labels of varying shapes and sizes to discs. Where it is desired to incorporate as much information as possible on label 2, the label may extend to almost the outer edge of the disc. Alternatively, where the surface area needed to convey the information is not as great, label 2 may be of substantially smaller diameter than that of the disc.

Labels for use on compact discs, such as CD ROM 1, have heretofore been such that information printed on the surface the disc is obscured. This is disadvantageous in situations where it is desired to add information, but at the same time, retain access to the information already provided. Until now, it has been necessary to reproduce the original information together with the additional information on the label to be affixed. Such an operation is both time consuming and increases the chance of introducing errors into the original material.

Therefore, a further aspect of the present invention resides in a compact disc label capable of allowing visual inspection of the surface of CD ROM 1 underneath label 2. More particularly, the present invention comprises a transparent compact disc label.

Not all transparent materials are suitable for application to compact discs. Further, the adhesive used to adhere the label to the disc must be compatible with both CD ROM 1 and label 2. The label material and adhesive must be selected to avoid the bubbling and creasing of label 2 during application of the label to CD ROM 1. It is also important for any such label 2 to be printable by both inkjet and laser printers. According to one aspect of the invention, one side of label 2 is coated with a coating that can receive an inkjet dye or pigment without the dye or pigment smudging or rubbing off.

Advantageously, transparent compact disc label 2 according to the present invention comprises a transparent, flexible polymeric material having a coating of an acrylic-based adhesive on at least one surface. The polymeric material may be a polyester or the like.

While the invention has been described in relation to the fixing of labels onto compact discs, it will be understood that the device according to the invention can be applied to any similar situation where it is desired to concentrically align two or more substantially planar members.

What is claimed is:

1. An apparatus for affixing a label to a compact disc in a substantially concentric manner, the label having a non-adhesive side and a central opening of a first diameter, the compact disc having a labeling side with a non-labeling area and a central opening of a second diameter smaller than the first diameter, the apparatus comprises:

a cover member having a central hole and a label support surface adapted to support the non-adhesive side of the label;

a support structure;

a movable assembly having a first member, a second member and means for retaining the movable assembly in the support structure; and a resilient member, wherein the second member is connected to the first member to form a support shoulder adapted to support at least a portion of the non-labeling area of the compact disk, wherein the movable assembly is adapted to move with respect to the label support surface, at least partially within the support structure, between a first position having the support shoulder above the label support surface and a second position having the support shoulder proximate to the label support surface, and wherein the resilient member is adapted to cooperate with the movable assembly to move the movable assembly between the first position and the second position.

2. The apparatus of claim 1, wherein the means for retaining comprises a retaining shoulder formed the first member, and at least a portion of the retaining shoulder is larger than and adapted to be retained by the central hole of the cover member.

3. The apparatus of claim 1, wherein the support shoulder is larger than the central opening of the compact disk but smaller than the central opening of the label.

4. The apparatus of claim 1, wherein the structure has a top, a bottom and a hollow therebetween and the cover member has a bottom side, the bottom side of the cover member is affixed to the top of the structure such that the hollow and the central hole of the cover member are aligned.

5. The apparatus of claim 1, wherein in the second position the support shoulder is below or substantially level with the label support surface.

6. The apparatus according to claim 1, wherein the movable assembly has a downwardly facing surface, and wherein the resilient member cooperates with the downwardly facing surface.

7. The apparatus of claim 1, further comprising a bottom plate affixed to the bottom of the structure.

8. The apparatus of claim 7, wherein the cover member, the structure and the bottom plate form an enclosed container.

9. The apparatus of claim 8, further comprising a central hole defined within the bottom plate, wherein the bottom plate is affixed to the bottom of the structure such that the hollow and the central hole of the bottom plate are aligned.

10. The apparatus of claim 8, wherein the resilient member cooperates with and is retained within the enclosed container by the bottom plate.

11. The apparatus of claim 1, wherein the movable assembly is a unitary device.

12. The apparatus of claim 1, wherein the structure is a cylinder.

13. The apparatus of claim 1, wherein the first member is a cylinder having a diameter from about 40.5 mm to about 41.5 mm.

14. The apparatus of claim 1, wherein the label support surface is a circular surface having a diameter from about 118 mm to about 120 mm.

15. A device for applying a label having a non-adhesive side and a central opening of a first diameter to a compact disc having a labeling side with a non-labeling area and a central opening of a second diameter smaller than the first diameter, the device comprising:

- a cover member having a central hole and a label support surface adapted to support the non-adhesive side of the label;
- a structure having a hollow, the structure being connected to the cover member such that the hollow and the central hole are substantially aligned; and
- a movable assembly slidably received within the hollow, the movable assembly having a first shoulder adapted to retain the movable assembly within the hollow and a second shoulder adapted to support at least a portion of the non-labeling area of the compact disk,
- wherein at least a portion of the first shoulder is larger than the central hole of the cover member, and wherein the movable assembly is adapted to slide the second shoulder from a position above the label support surface to another position about level with the label support surface.

16. The device of claim 15, wherein the second shoulder is larger than the central opening of the compact disk but smaller than the central opening of the label.

17. The device of claim 16, further comprising a resilient member received within the hollow of the structure and adapted to bias the first shoulder against the cover member.

18. The device according to claim 17, wherein the movable assembly has a downwardly facing surface, and the resilient member cooperates with the downwardly facing surface to bias the first shoulder against the cover member.

19. A unitary device to affix a label to a compact disc in a substantially concentric manner, the label having a first central aperture of a first diameter and the compact disc having a second central aperture of a second diameter smaller than the first diameter, the device including:

- a label support surface having an opening therethrough;
- a movable assembly retained in said opening to operate by reciprocal movement through said opening;
- said assembly having a first portion and a second portion, said first portion being connected to said second portion to form a shoulder adapted to support at least a part of the compact disc;
- said first and second portions being respectively configured to retain the label and compact disc in generally coaxially aligned positions by the first portion extending through said first central aperture and the second portion extending through said second central aperture;
- said movable assembly being adapted to move from a first raised position wherein the compact disc on said shoulder is above the label support surface, to a second retracted position wherein the compact disc is brought into substantially concentric contact with the label on the label support surface.

20. The device according to claim 19, wherein said movable assembly is guided for reciprocal movement by a tube that is fixed relative to the label support surface.

21. The device according to claim 19, further comprising a spring to bias said movable assembly to the first raised position.

22. The device according to claim 19, wherein said first and second portions have substantially concentric generally cylindrical shapes.

\* \* \* \* \*